United States Patent [19]
Battocchio et al.

[11] Patent Number: 6,094,978
[45] Date of Patent: Aug. 1, 2000

[54] PROCESS AND DEVICES FOR DETECTION OF THE ACTUATION OF SUPPORT OF A TIRE ON A SAFETY BEARING

[75] Inventors: Claudio Battocchio, Almeria, Spain; Andre Dosjoub, Chamalieres, France

[73] Assignee: Compagnie Generale des Etablissements Michelin-Michelin & Cie, Clermont-Ferrand, France

[21] Appl. No.: 08/379,443
[22] PCT Filed: Jul. 29, 1993
[86] PCT No.: PCT/EP93/02025
 § 371 Date: Feb. 3, 1995
 § 102(e) Date: Feb. 3, 1995
[87] PCT Pub. No.: WO94/03338
 PCT Pub. Date: Feb. 17, 1994

[30] Foreign Application Priority Data

Aug. 3, 1992 [FR] France ................................ 92 09645

[51] Int. Cl.$^7$ .......................... B26C 23/02; B26C 23/04
[52] U.S. Cl. ........................ 73/146.2; 346/443; 346/683
[58] Field of Search ................... 73/146, 146.2; 340/443, 626, 683, 669

[56] References Cited

U.S. PATENT DOCUMENTS

| | | |
|---|---|---|
| 4,157,726 | 6/1979 | Brewer . |
| 4,160,234 | 7/1979 | Karbo et al. ............................. 340/58 |
| 4,262,724 | 4/1981 | Sarkissian . |
| 4,574,267 | 3/1986 | Jones ........................................ 340/58 |
| 5,252,946 | 10/1993 | Walker et al. ..................... 73/146.2 X |

FOREIGN PATENT DOCUMENTS

0 363 639  4/1990  European Pat. Off. .

Primary Examiner—Joseph L. Felber
Attorney, Agent, or Firm—Oblon, Spivak, McClelland, Maier & Neustadt, P.C.

[57] ABSTRACT

Process and devices for detection of the actuation of support of a tire on a safety support, the process and these devices being characterized by the fact that, when support actuation occurs, they detect the appearance of a resonance mode characteristic of supported rolling travel in the components of the vehicle suspension.

29 Claims, 6 Drawing Sheets

PROCESS AND DEVICES FOR DETECTION OF THE ACTUATION OF SUPPORT OF A TIRE ON A SAFETY BEARING

TECHNICAL FIELD

The invention concerns the rolling conditions of a tire equipped with a safety bearing and, more specifically, the detection of the actuation of the support of said tire on said safety bearing.

BACKGROUND ART

The function of these safety supports, which are normally mounted on the rim inside the tire, is to take over the load in the event of tire failure.

The actuation of the support of the tire on the safety bearing might not be perceptible to the driver based on vehicle handling. However, the performance parameters of the tire in this condition are deteriorated, notably because the functional life of these safety bearings is limited. Thus, for safety, the driver be alerted as soon as the support of a tire is actuated on its safety bearing, in order to be able to follow the manufacturer's instructions.

U.S. Pat. No. 4,262,724 discloses a safety bearing comprising circumferential sections having variable radii so as to generate, when travelling using the support, a vibratory excitation in the wheel shaft which warns the driver. U.S. Pat. No. 4,157,726 discloses a safety bearing incorporating two flat surfaces positioned on the outer circumference in order to produce, in addition to the aforementioned vibratory excitation, a rolling noise that can also warn the driver.

These two solutions, which purposely cause deterioration of vehicle behavior when the tire is supported on its safety support, prove suitable when the function of said support is to prevent the instantaneous immobilization of the vehicle in the event of tire failure. On the other hand, when the design of the safety bearing permits the use thereof at a restricted speed over long distances, these solutions are no longer adequate. A safety bearing of this kind is disclosed by Patent No. EP 363 639 the parent patent of which is U.S. 5,363894.

Moreover, many devices have been proposed for detecting the under-inflation of a tire by analyzing the vibrations of the tire/suspension components unit as measured using accelerometers placed on one of the suspension components of the vehicle. These devices monitor changes in the frequency of the first vertical resonance mode of said tire-suspension assembly in the range of approximately 10 to 15 Hz and in conjunction with the reduction of inflation pressure. A device of this kind is disclosed, for example, in U.S. Pat. No. 4,574,267.

However, these devices do not make it possible to detect the actuation of the safety bearing of a tire, since this actuation of support may result not only from a loss of tire inflation pressure, but also from other causes, including tire overload. Accordingly, there is no direct relationship between the inflation pressure of a tire a nd th e actuation of the safety support.

In the following description, the term "wheel-carrier" refers to the parts which actually carry the wheels in the absence of any lack of connection, except for the travelling rotation of said wheels, as well as to the suspension components directly connected to the aforementioned parts and for which the courses of travel are similar.

The expression "non-suspended masses" refers to all of the masses not supported by the suspension springs, i.e., those located between the tires a nd said suspension springs.

DISCLOSURE OF THE INVENTION

The invention relates to a process of detection of the actuation of the support of at least one of the tires on a vehicle on the safety bearing thereof, said process being characterized by the fact that the appearance of at least one resonance mode of at least one of the components involved in the suspension of the passenger compartment of the vehicle, the resonance mode being a characteristic of the rolling travel of said tire supported by said safety bearing, is detected.

The appearance of resonance modes greater than the first resonance mode, and advantageously within frequency bands greater than 100 Hz, is detected.

According to one embodiment, the acceleration phenomena to which at least one of said suspension elements is subjected is measured during rolling travel.

Preferably, the acceleration measurements are made on the wheel- carrier of the tires equipping a vehicle, these measurements being, in particular, those of the vertical acceleration phenomena.

The invention is based on the observation that the actuation of the support of a tire on a safety bearing leads to the appearance of wheel-carrier resonance modes which typify the supported wheel/safety support/non-suspended masses/suspension spring system However, the first vertical resonance mode of this system lies in a frequency band of approximately 20 Hz, which cannot be used because of signals emanating from very diverse sources.

On the other hand, the tests conducted revealed that detection of the appearance of modes of resonance of larger magnitudes was possible and reliable. These tests also showed that the mechanical excitation of these systems resulting simply from running the vehicle on a normal road was sufficient to excite the wheel-carriers within the frequency bands corresponding to the modes of resonance characteristic of supported travel.

One feature of the process according to the invention lies in the fact that the acceleration-measurement signals are, in at least one given frequency band, processed so as to obtain magnitudes typical of the amplitudes of these signals in said frequency band. These magnitudes are monitored as characteristic magnitudes.

Among the magnitudes typical of the amplitude of said signals, the root mean square value proves especially appropriate.

According to a first variant of the invention process, detection is effected by comparing the characteristic magnitudes as measured simultaneously on at least two tires.

According to a second variant, the process according to the invention is characterized by virtue of the fact that it detects said actuated support independently for each of the tires on the vehicle.

According to another aspect of the invention, a form-factor of the spectrum of the vibrations of said wheel-carrier is calculated, and actuated support is detected when said form-factor exceeds a given threshold.

The acceleration-measurement signals may be processed in two given, distinct frequency bands $H_1$ and $H_2$, so as to obtain two values representative of the amplitudes of said signals in the two frequency bands, and to determine the ratio between said two representative values $D_1/D_2$. This ratio represents a characteristic form-factor.

The invention also relates to several devices designed to implement the process described above.

A device for detection of the actuation of the support of at least one of the tires equipping a vehicle on a safety bearing in accordance with a first variant of the process according to the invention is made noteworthy by virtue of the fact that said device comprises:

a) vertical acceleration-measurement means positioned at the wheel-carriers of the wheels of said vehicle;

b) means for filtering the measurement signals within a given frequency band;

c) processing means which give the root mean square values of said measurement signals, said root mean square values being taken as characteristic magnitudes;

d) means for comparing the characteristic magnitudes emanating simultaneously from the various wheel-carriers so as to detect actuation of support;

e) means making it possible to transmit the detection results to the vehicle driver.

A device for detection of the actuation of support of at least one of the tires equipping a vehicle on a safety bearing in accordance with a second variant of the process according to the invention is made noteworthy by virtue of the fact that said device comprises:

a) acceleration-measurement means positioned at the wheel-carriers of the wheels of said vehicle;

b) means for filtering the measurement signals in two given frequency bands $F_1$ and $F_2$;

c) processing means giving the root mean square values D1 and D2 of said measurement signals;

d) means making it possible to calculate the ratio D1 and D2 independently for the measurements of each wheel-carrier;

e) means for analysis of said ratios making possible the detection of the actuation of support as soon as at least one of said ratios exceeds a given threshold;

f) means making it possible to transmit the detection results to the driver of the vehicle.

BRIEF DESCRIPTION OF THE DRAWINGS

The attached drawings illustrate the invention and are provided solely as examples.

MODE FOR CARRYING OUT THE INVENTION

Figure 1:
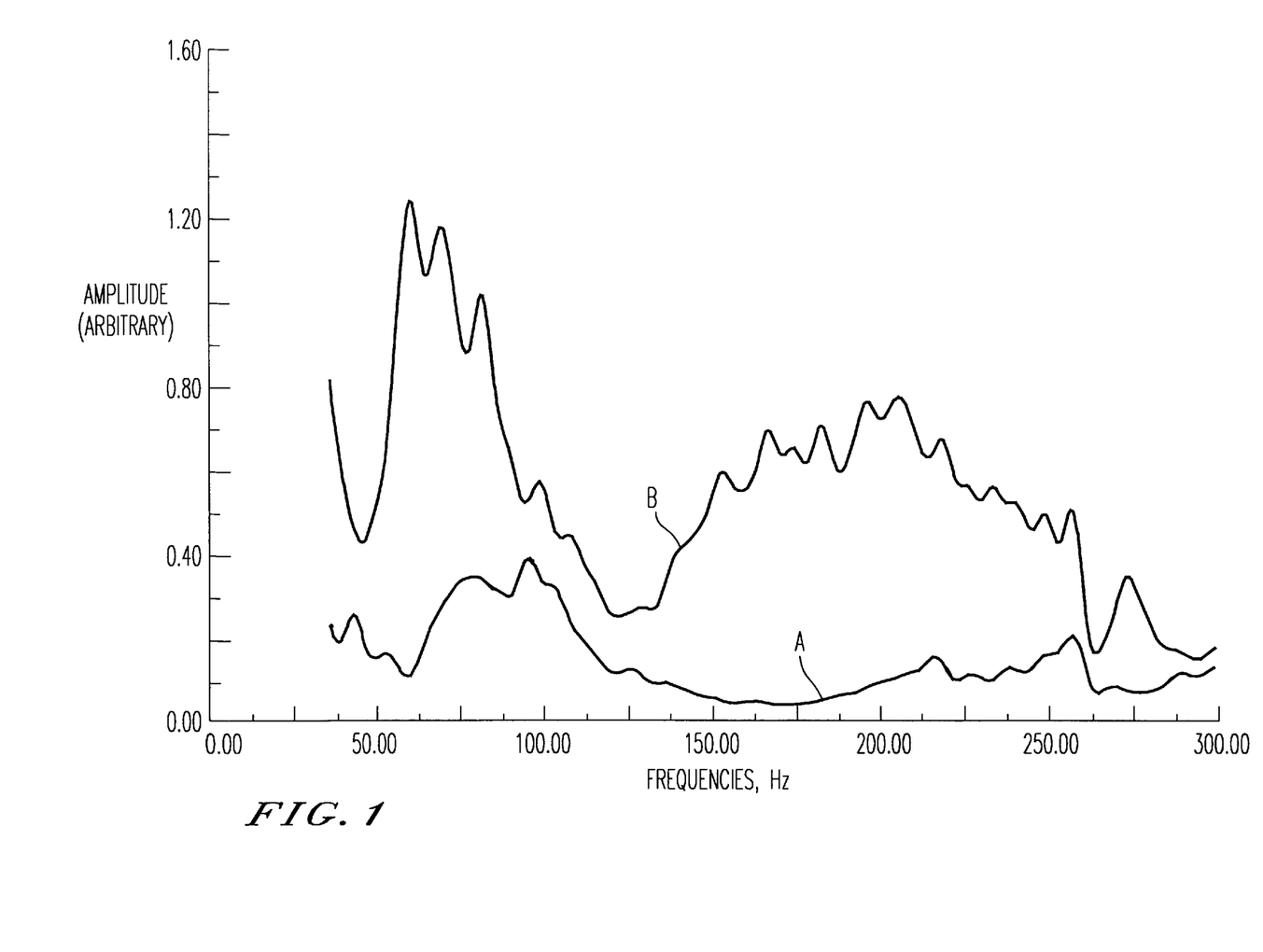
FIG. 1 illustrates two spectra of the vertical acceleration phenomena as a function of frequency with and without support as recorded on a normal road.

FIG. 1 shows two spectra of vertical acceleration phenomena as measured for inflation pressures of 2.0 and 0.2 bars, first without then with support for a 175/70 R 13 MXL tire equipped with an "LFZ"-type safety support, as described in Patent No. EP 363 639. The vehicle was a Citroën AX RE.

The frequency band analyzed ranged from 40 to 300 Hz. The first vertical resonance modes of the tire/suspension component unit (the tire being normally inflated or supported on its safety support), as well as numerous signals from various sources, e.g., those associated with the frequency of the wheel circumference, e.g., the irregularities of the tire, were at a level of below 40 Hz. For this reason, a reliable analysis of the spectrum below 40 Hz proves very difficult.

The spectra in FIG. 1 were recorded as the vehicle travelled on a normal road by using an accelerometer placed on the wheel-carrier of the tire wheel.

These two curves illustrate the principle underlying the invention:

when the tire is inflated normally (curve A), the amplitude of the vertical acceleration phenomena as measured in the frequency band under consideration is appreciably lower than when the tire is supported on its safety bearing (curve B);

When the tire is inflated to 0.2 bar (curve B), that is, when it is supported on its safety support, there appears a characteristic resonance mode at about 200 Hz, while the vibration amplitude is appreciably less changed at about 100 Hz, thereby modifying markedly the shape of the vibration spectrum of the wheel-carrier.

When recordings similar to the curves in FIG. 1 were made on roads having different levels of surface roughness, the vertical acceleration spectra measured at the wheel-carriers had differing amplitudes, but the findings specified above remained valid. The changes of the shapes of the vibration spectra were also similar, whatever the position of the tire in question on the vehicle, the speed, and the load of said vehicle.

With respect to a vehicle whose four tires are equipped with safety supports, the process according to the invention thus consists of detecting the appearance of this resonance mode at about 200 Hz, a characteristic of the rolling travel of the tire supported on the safety support, by means of measurements of vertical acceleration phenomena taken at the wheel-carriers of the tire wheels.

According to a first variant, after filtering the measurement signals emitted by the four accelerometers so as to preserve only one frequency band encompassing the characteristic resonance mode, e.g., 140–250 Hz, a determination is made of the root mean square values thereof to be taken as the characteristic magnitudes.

The frequency band of the characteristic resonance mode is a function of the supported tire/safety support/non-suspended masses/suspension springs system. Precise determination of the frequency band monitored must be carried out by conducting a rolling test with and without support.

Actuation of the anchoring of at least one of the tires on the vehicle on its safety bearing is detected by comparing the characteristic magnitudes emanating simultaneously from the four accelerometers placed on the four wheel-carriers on the vehicle.

Figure 2:
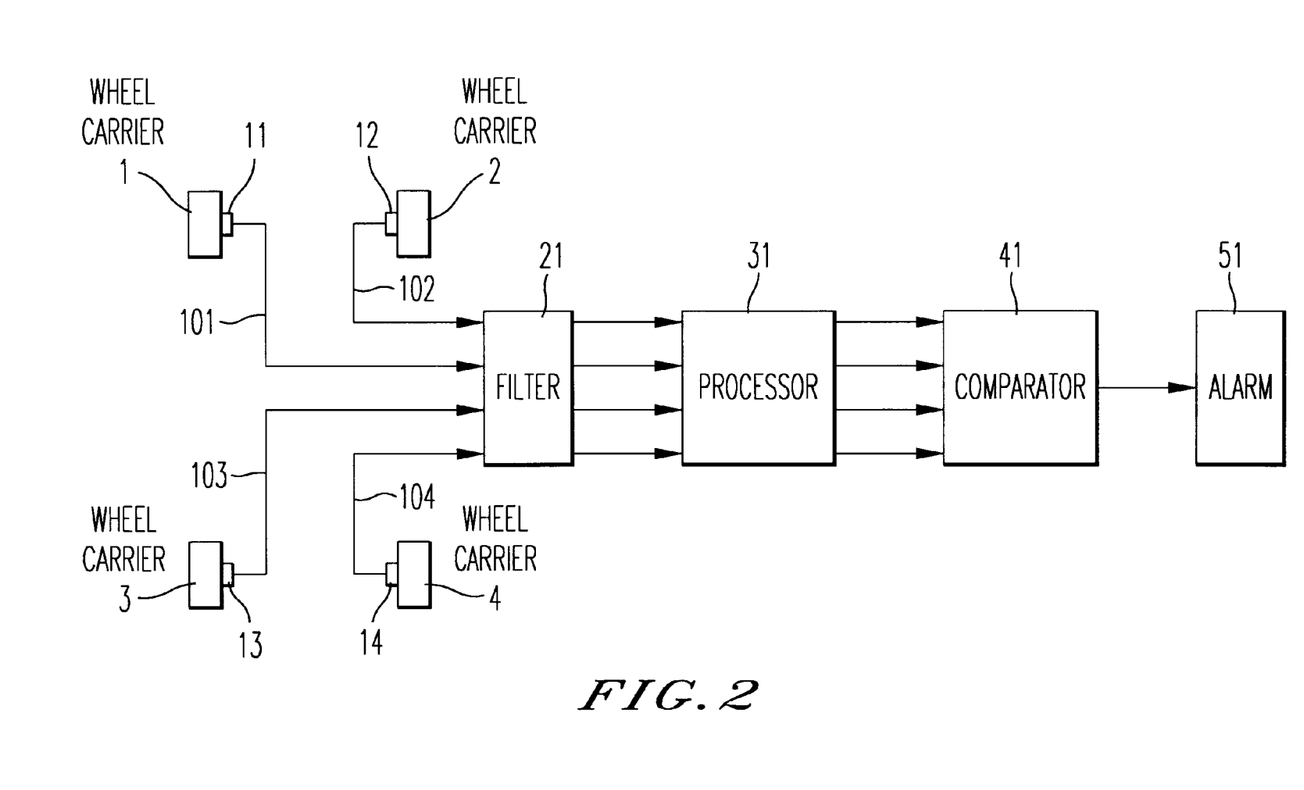
FIG. 2 is a skeleton diagram of the operation of a first type of detection device.

FIG. 2 illustrates the four wheel-carriers of a vehicle, i.e., the front left wheel-carrier 1 (AVG), the front right wheel-carrier 2 (AVD), the rear left wheel-carrier 3 (ARG), and the rear right wheel-carrier 4 (ARD). Each wheel-carrier is equipped with an accelerometer 11, 12, 13, and 14, respectively. The signals emanating from these accelerometers are transmitted over the lines 101, 102, 103, 104 to the filtering means or filter 21, which select their spectra within a given frequency band. The processing means or processor 31 give the root mean square values of the filtered signals in conventional fashion. These root mean square values are the characteristic monitored magnitudes S1, S2, S3, and S4. The comparison means or comparator 41 allow detection of the actuation of the support of at least one of the tires on its safety support, by comparing the characteristic magnitudes to each other. Finally, the detection signal emitted by the comparator 41 is transmitted to the alarm 51, which alerts the driver.

Figure 3:
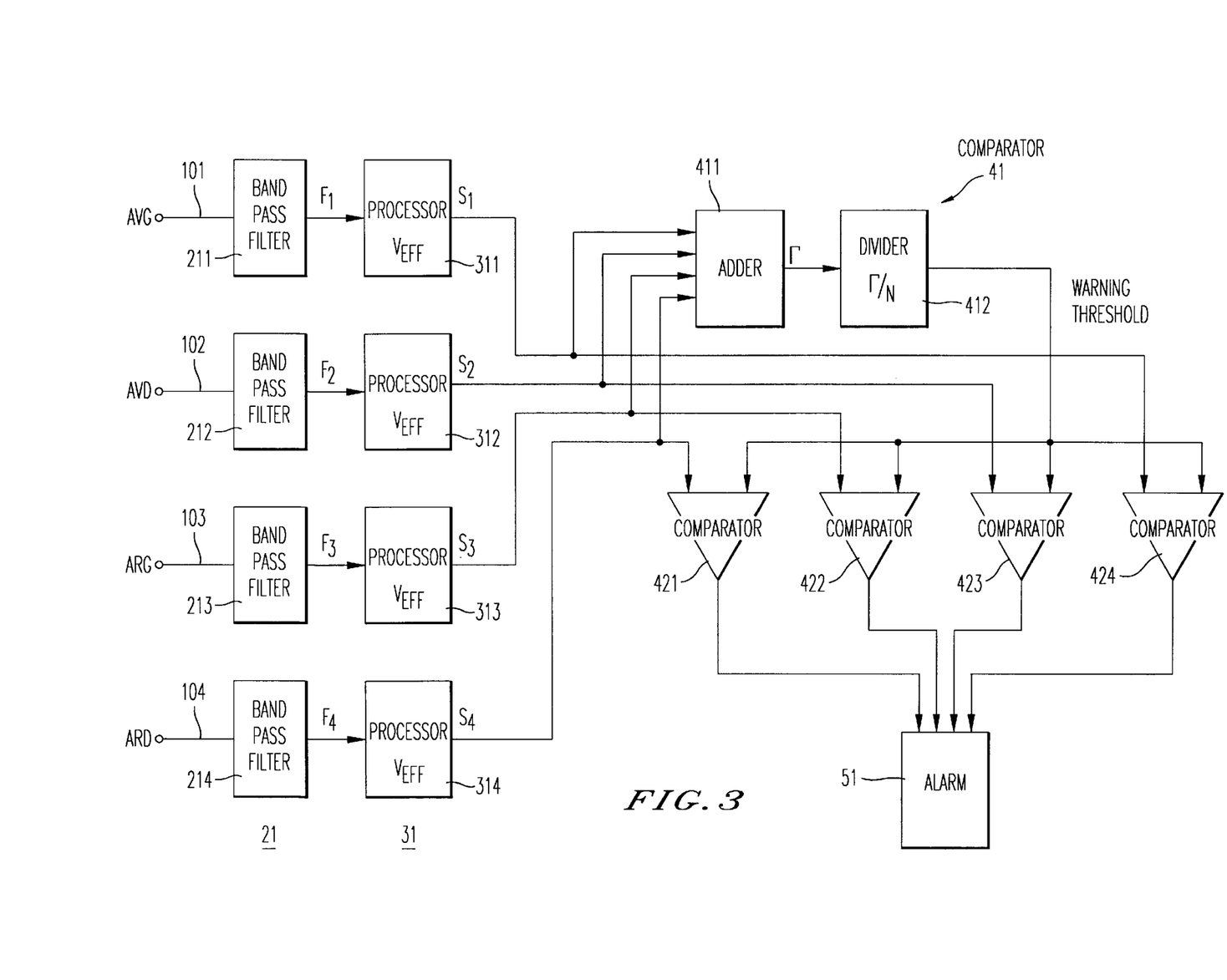
FIG. 3 is a block diagram of a first embodiment of a detection device.

A block diagram of a first device for detection of the actuation of the safety bearing of a tire is given in FIG. 3. The filtering means comprise of four band-pass filters 211, 212, 213, 214, which produce the signals F1, F2, F3, and F4, respectively. The processing means or processor 31 bear the reference numbers 311, 312, 313, and 314.

The comparison means or comparator 41 comprise:

a device for determining a warning threshold, comprising an adder 411 of the four characteristic root mean square values S1, S2, S3, S4, which generates the signal Γ=S1+S2+S3+S4, and a divider 412 which gives the ratio Γ/N, N being a number between 2 and 3;

four comparators 421, 422, 423, 424 which compare each of the characteristic values to Γ/N.

If any of the signals emitted from the comparators exceeds the threshold Γ/N, the corresponding wheel is considered to be supported on the safety support.

The warning threshold Γ/N varies with the excitation amplitude. This device thus makes it possible to detect the actuation of the support of at least one of the vehicle tires independently of the surface roughness of the road.

Figure 4:
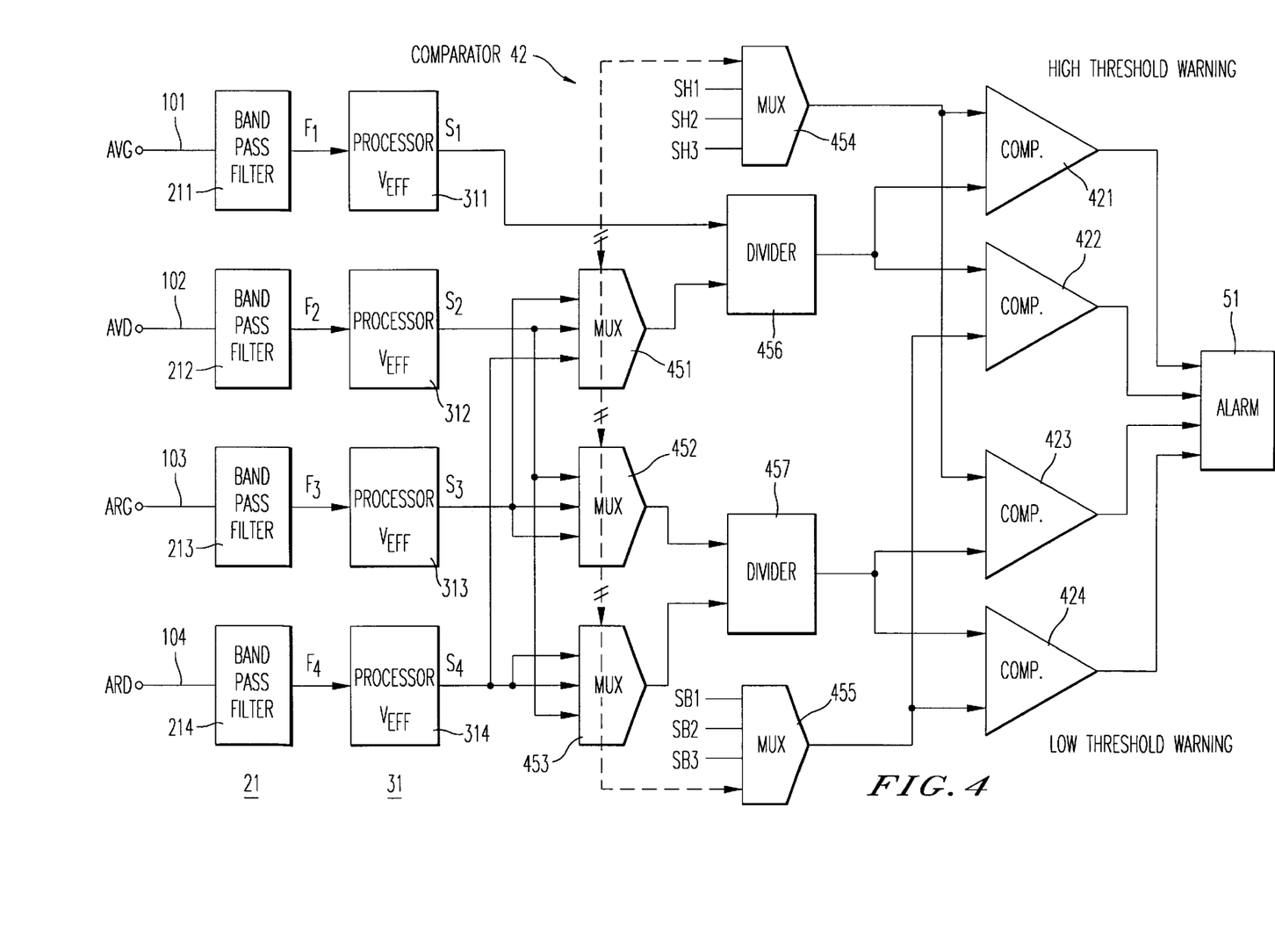
FIG. 4 is a block diagram of a second embodiment.

A second embodiment is shown in FIG. 4. The function of the comparison means or comparator 42 lies in calculating the ratios between pairs of characteristic magnitudes, in order to detect actuation of support when the value of any of these ratios lies outside a given range.

These comparison means or comparator 42 incorporate:

three three-input multiplexers 451, 452, 453 connected at the input to the processing means 312, 313, 314;

two dividers 456, 457 arranged at the output of the processing apparatus 311 and of the three multiplexers 451, 452, 453;

two multiplexers 454 and 455, which have three input values corresponding to the high and low warning thresholds, respectively;

four comparators 421, 422, 423, 424 at the output of the two dividers 456, 457 and of the two multiplexers 454 and 455.

The operating cycle of the comparison means 42 is as follows:

phase 1: The five multiplexers 451, 452, 453, and 455 are in position 1, the divider 456 calculates the ratio R1=S1/S3, and the divider 457 calculate R2=S2/S4. R1 is then compared to the high threshold SH1 using the comparator 421, and to the low threshold SB1 using the comparator 422. R2 is compared to the same high and low thresholds using the comparators 423 and 424. The ratios between characteristic magnitudes are calculated in relation to the positions of the wheel-carriers on a side-by-side basis;

phase 2: The five multiplexers 451, 452, 453, 454, and 455 are in position 2. The divider 456 calculates the ratio R1=S1/S2, and the divider 457 R2=S3/S4. R1 is then compared to the high threshold SH2 using the comparator 421 and to the low threshold SB2 using the comparator 422. R2 is compared to the same high and low thresholds using the comparators 423 and 424, and the ratios between characteristic magnitudes are calculated axle-by-axle;

phase 3: The five multiplexers 451, 452, 453, 454, and 455 are in position 3. The divider 456 calculates the ratio R1=S1/S4, and the divider 457, R2=S3/S2. R1 is then compared to the high threshold SH3 using comparator 421 and to the low threshold SB3 using comparator 422. R2 is compared to the same high and low thresholds using comparators 423 and 424. The ratios between characteristic magnitudes are calculated diagonal by diagonal.

As soon as one of the preceding ratios falls outside the ranges delimited respectively by the thresholds (SH1 and SB1), (SH2 and SB2), (SH3 and SB3), a support-detection signal is transmitted to the alarm 51. The warning transmitted includes all of the information needed to identify the tire(s) involved.

This device has the advantage of making it possible to differentiate the detection thresholds as a function of the type of ratio involved: i.e., side by side, axle by axle, or diagonal by diagonal. This makes it possible to limit untimely alarms.

Figure 5:
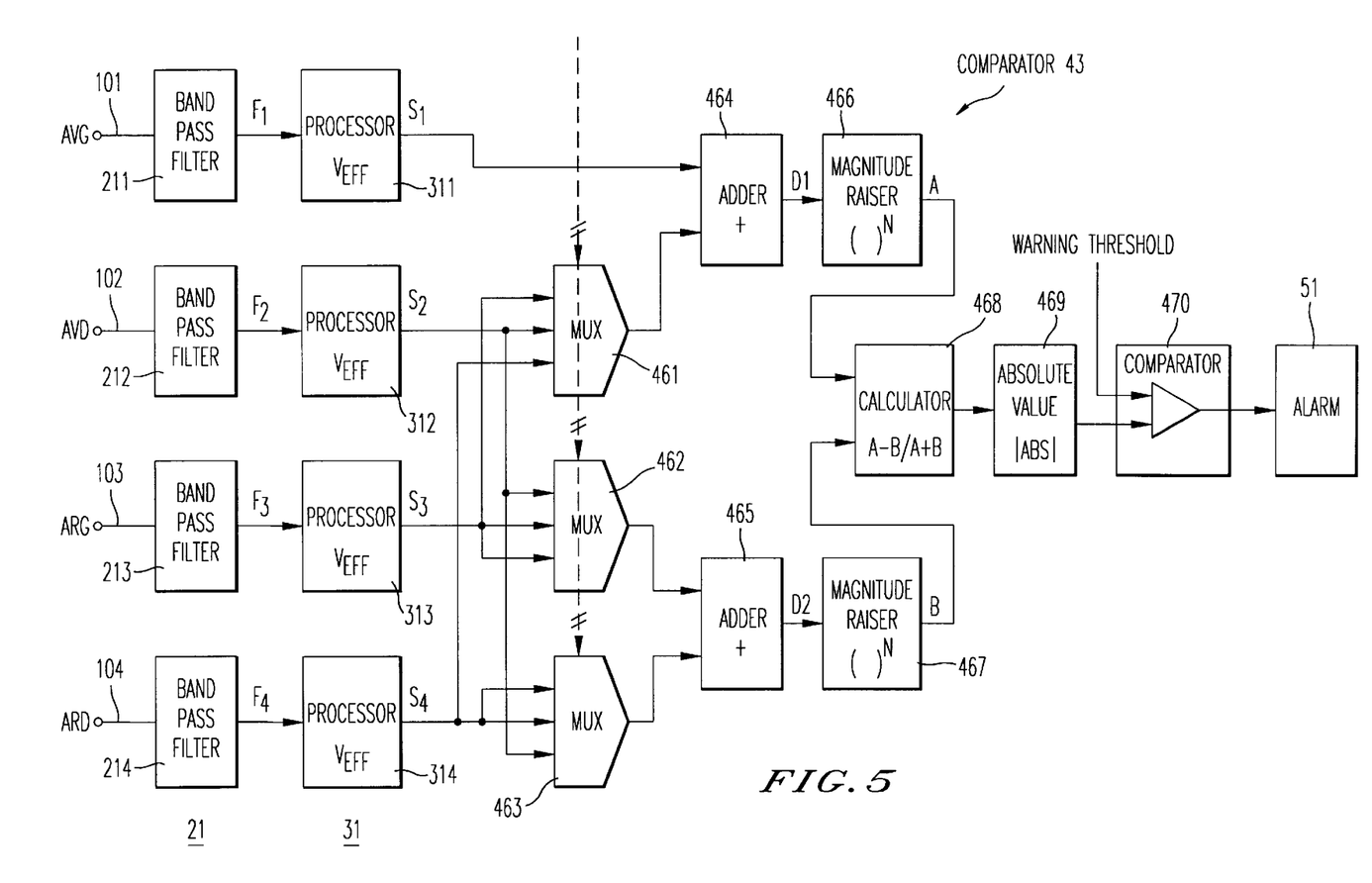
FIG. 5 is a block diagram of a third embodiment.

A third embodiment is shown in FIG. 5. The comparison means 43 in this device incorporate:

three multiplexers 461, 462, 463 placed at the output of the processing means or processors 312, 313, 314; two adders 464 and 465 arranged at the output of the processing apparatus 311 and of the multiplexer 461, respectively, and of the two multiplexers 462 and 463. Values D1 and D2 are obtained;

two devices 466, 467 used to raise the values D1 D and D2 to the power N, thus giving numerical quantities A=(D1)$^N$, B=(D2)$^N$;

calculator means 468 used to calculate the function:

$$T = \frac{A-B}{A+B};$$

absolute value calculator means 469 used to give the absolute value of T: G=|T|;

a comparator 470 which compares G to a given warning threshold.

The operating cycle of the comparison means 43 is as follows:

Phase 1: The three multiplexers 461, 462, 463 are in position 1. The two adders 464 and 465 give values D1=S1+S3 and D2=S2+S4, respectively. Finally:

$$G = \left| \frac{(S1+S3)^N - (S2+S4)^N}{(S1+S3)^N + (S2+S4)^N} \right|$$

The comparison is made on a side-by-side basis.

Phase 2: The three multiplexers 461, 462, 463 are in position 2. The two adders 464 and 465 give D1=S1+S2 and D2=S3+S4, respectively. Finally:

$$G = \left| \frac{(S1+S2)^N - (S3+S4)^N}{(S1+S2)^N + (S3+S4)^N} \right|$$

The comparison is made on an axle-by-axle basis.

Phase 3: The three multiplexers 461, 462, 463 are in position 3. The two adders 464 and 465 give D1=S1S4 and D2=S3+S2, respectively. Finally:

$$G = \left| \frac{(S1+S4)^N - (S3+S2)^N}{(S1+S4)^N + (S3+S2)^N} \right|$$

The comparison is made diagonally.

At the end of each phase, the comparator 470 compares G with a given warning threshold and, if necessary, transmit the warning to the driver by means of the alarm 51.

The function T makes it possible to standardize signals D1 and D2 and, accordingly, to ignore the surface roughness of the road.

The parameter N determines the sensitivity of the system. N is normally between 2 and 3, but may be less than 1 if the system is excessively sensitive.

According to a second embodiment and for a vehicle in which all of the tires are equipped with a safety support, the process according to the invention consists in detecting, independently for each wheel-carrier on the vehicle, the modification of the shape of the vibration spectrum of the wheel-carrier resulting from the appearance of this resonance mode in the vicinity of 200 Hz, a phenomenon which characterizes the rolling travel of the tire supported on the safety support, using acceleration measurements taken at the wheel-carriers of the tire wheels.

After filtering the measurement signals from the four accelerometers so as to retain only two frequency bands, the first of about 100 Hz and the second containing the characteristic resonance mode at about 200 Hz, or for example 140–250 Hz, determination is made of the root mean square values and then of the ratio of said root mean square values that will be taken as the characteristic form-factor. Detection of the actuation of support is transmitted to the driver when said form-factor exceeds a predetermined threshold.

The two frequency bands monitored are functions of the supported tire/safety support/non-suspended masses/suspension spring system. Precise determination of these frequency bands should be made based on a rolling test with and without support.

Figure 6:
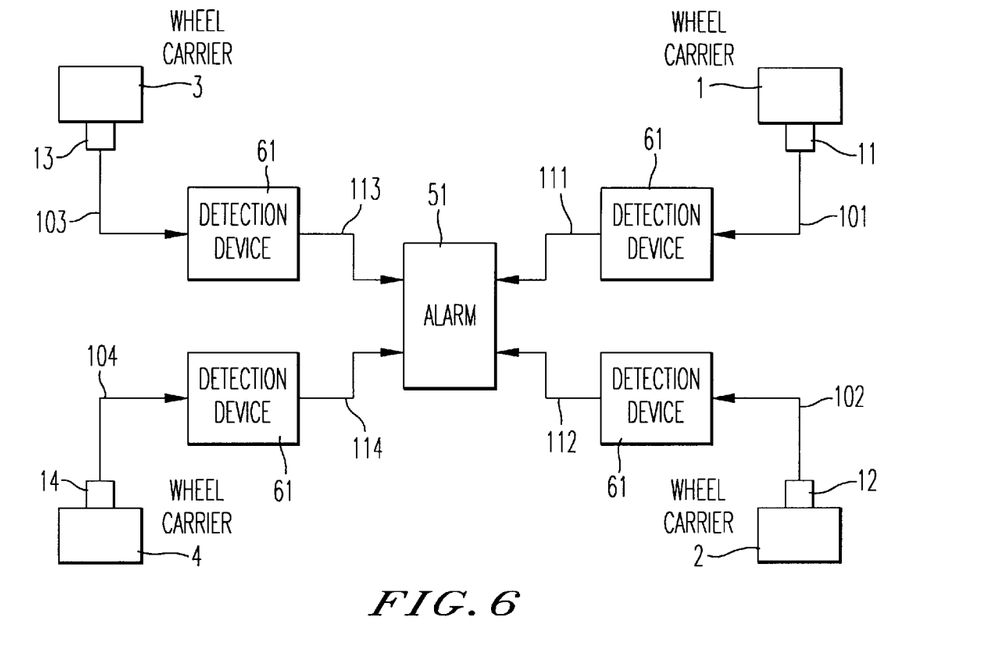
FIG. 6 is a skeleton diagram of the operation of a second type of detection device.

FIG. 6 is a second simplified diagram showing the operation of detection devices corresponding to the second variant. The four wheel-carriers of a vehicle 1, 2, 3, 4 are shown. Each wheel-carrier is equipped with an accelerometer 11, 12, 13, 14, respectively. The signals generated by these accelerometers are transmitted over lines 101, 102, 103, 104 to the four detection apparatuses 61, which are independent for each wheel-carrier. The alarm 51 receives the warning signals over lines 111, 112, 113, 114 and sends them to the driver.

Figure 7:
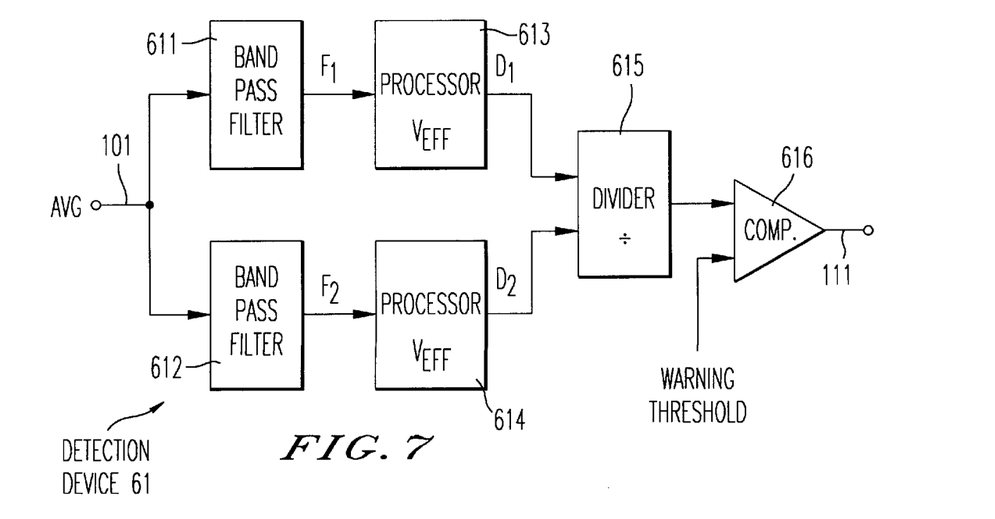
FIG. 7 is a block diagram of an embodiment of a detection device of the second type.

A block diagram of a device 61 for detection of the actuation of support of a tire on its safety bearing in accordance with the second embodiment variant is shown in FIG. 7.

This detection device 61 comprises:
- two band-pass filters 611, 612, which give the signals $F_1$ and $F_2$, respectively, corresponding to the two characteristic frequency bands;
- two processing devices or processors 613, 614 which give the root mean square values of said signals $F_1$ and $F_2$, values or D1 and D2;
- a divider 615 for calculation of the ratio $D1/D_2$, which is the characteristic form-factor;
- a comparator 616 which compares said form-factor to a predetermined warning threshold.

The detection device and process described above have the advantage of performing detection independently for each tire, thereby permitting very broad tolerances on the acceleration-measurement systems, since an amplitude ratio of the components of a signal emanating from the same sensor is observed.

This device also proves advantageous by virtue of its capacity to provide warning when all of the tires on a vehicle are placed in a support configuration simultaneously. To enable the first variant of the process to transmit a warning, at least one of the tires on said vehicle must, by design, remain inflated normally so as to serve as a reference.

To achieve better performance, for example greater sensitivity when the support is first actuated, it is possible to establish a threshold and frequency bands which vary as a function of speed.

The foregoing diagrams illustrate embodiments using discrete components and based on analog processing of the signals. It is obviously possible to produce devices according to the invention while opting to ensure that all or a portion of the various functions described will be carried out using digital signal-processing means, whether or not they are controlled by a micro-controller.

The processes and devices forming the object of the invention are designed, in particular, for the detection of the actuation of the safety supports for tires equipping automotive vehicles having a minimum of four wheels. They may also be used on two-wheel vehicles as described above.

What is claimed is:

1. Process for detection of the actuation of a support of at least one of the tires of a vehicle on a security bearing, which comprises detecting the appearance of at least one resonance mode of at least one component involved in the suspension of the passenger compartment of the vehicle, wherein said resonance mode is a characteristic of rolling travel of said tire supported on said safety bearing, said characteristic resonance mode detected being of an order greater than a first resonance mode and wherein the characteristic resonance mode detected is in a frequency band exceeding 100 Hz.

2. Detection process according to claim 1, wherein at least one of said suspension components is subjected to an acceleration phenomena measured during rolling travel.

3. Detection process according to claim 2, which comprises measuring the acceleration phenomena of the wheel-carriers of the tires of said vehicle during rolling travel.

4. Detection process according to claim 3, which comprises measuring the vertical acceleration phenomena of the wheel-carriers of said vehicles.

5. Detection process according to claim 4, which comprises processing the signals generated from the measuring of the vertical acceleration phenomena in at least one given frequency band, so as to obtain representative magnitudes of their amplitudes on said frequency band, said magnitudes being taken as characteristic magnitudes.

6. Detection process according to claim 5, which comprises taking the root mean square values of the signals generated from the vertical acceleration phenomena as characteristic magnitudes.

7. Detection process according to claim 5, which comprises effecting detection by comparing the characteristic magnitudes measured simultaneously for at least two tires.

8. Detection process according to claim 7, which comprises monitoring the characteristic magnitudes in a given frequency band.

9. Detection process according to claim 5, wherein detection is carried out independently for each tire.

10. Detection process according to claim 9, which comprises calculating a form-factor of a vibration spectrum of said suspension component and the detection of the actuation of support of said tire when said form-factor exceeds a given threshold.

11. Detection process according to claim 10, which comprises calculating said form-factor by processing said acceleration-measurement signals in two given frequency bands $F_1$ and $F_2$, so as to determine the ratio of their characteristic magnitudes D1/D2.

12. Device for the detection of the actuation of the support of at least one of the tires on a vehicle with a safety support, wherein said device comprises:
   a) vertical acceleration-measurement means positioned at the wheel-carriers of the wheels of said vehicle;
   b) filter means for filtering measurement signals from said acceleration measurement means within a frequency band exceeding 100 Hz;
   c) processing means for obtaining the root mean square values of said measurement signals, said root mean square values being taken as characteristic magnitudes;
   d) comparator means for comparing the characteristic magnitudes emanating simultaneously from the various wheel-carriers so as to detect actuation of the support; and
   e) transmitting means for transmitting the detection results to the vehicle driver.

13. Detection device according to claim 12, wherein the comparator means for comparing the characteristic magnitudes comprise:
   a) a device for determining a warning threshold, said device comprising an adder for adding four characteristic root mean square values S1, S2, S3, S4, which generates the signal $\Gamma = S1+S2+S3+S4$, and a divider for obtaining a ratio $\Gamma/N$, N being a given number; and
   b) four comparators for comparing each of the characteristic values to $\Gamma/N$.

14. Detection device according to claim 13, wherein N has a value between 2 and 3.

15. Detection device according to claim 12, wherein the comparator means for comparing the characteristic magnitudes comprise means for calculating the ratios between the paired characteristic magnitudes.

16. Detection device according to claim 15, wherein the actuation of the support of a tire on its safety bearing is detected when any of the ratios between the paired characteristic magnitudes is outside a given range.

17. Detection device according to claim 12, wherein the comparator means for comparing the characteristic magnitudes comprise:
   a) adding means for adding up the characteristic magnitudes in pairs, and obtaining the values D1 and D2 thereof;
   b) means for subtracting and adding said values D1 and D2, so that numerical quantities $A=D1-D2$ and $B=D1+D2$ are obtained;
   c) calculating means for calculating the ratio between the absolute values of said quantities A and B; and
   d) means for analyzing said ratios and detecting the actuation of support as soon as at least one of said ratios exceeds a given threshold.

18. Detection device according to claim 17, wherein said calculating means comprises means for raising the values D1 and D2 to a power N.

19. Detection device according to claim 18, wherein the value of N governs the sensitivity of the device.

20. Device for the detection of the actuation of support of at least one of the tires on a vehicle on a safety bearing, wherein said device comprises:
   a) acceleration-measurement means positioned at the wheel-carriers of the wheels of said vehicle;
   b) means for filtering the measurement signals in two frequency bands wherein each of said frequency bands exceeds 100 Hz;
   c) processing means for providing the root mean square values D1 and D2 of said measurement signals, said root mean square values being monitored as characteristic magnitudes;
   d) means for calculating the ratio $D_1/D_2$ of the characteristic magnitudes emanating from the various wheel-carriers independently for the measurements of each wheel-carrier;
   e) means for analyzing said ratios and detecting the actuation of support as soon as at least one of said ratios exceeds a given threshold; and
   f) means for transmitting the detection results as to the activation of the support to the driver of the vehicle.

21. Device for the detection of the actuation of the support of at least one of the tires on a vehicle with a safety support, wherein said device comprises:
   a) a vertical acceleration-measurement mechanism positioned at the wheel-carriers of the wheels of said vehicle;
   b) a filter filtering the measurement signals from said acceleration-measurement mechanism within a frequency band exceeding 100 Hz;
   c) a processing mechanism obtaining the root mean square values of said measurement signals, said root mean square values being taken as characteristic magnitudes;
   d) a comparator comparing the characteristic magnitudes emanating simultaneously from the various wheel-carriers so as to detect actuation of the support;
   e) a transmitter transmitting results detecting actuation of the support to the vehicle driver.

22. Detection device according to claim 21, wherein the comparator comparing the characteristic magnitudes comprises:
   a) an adder adding the four characteristic root mean square values S1, S2, S3, S4, which generates the signal $\Gamma = S1+S2+S3+S4$, and a divider for obtaining the ratio $\Gamma/N$, N being a given number; and
   b) four comparators comparing each of the characteristic values to $\Gamma/N$.

23. Detection device according to claim 22, wherein N has a value between 2 and 3.

24. Detection device according to claim 22, wherein the comparator comparing the characteristic magnitudes comprises a calculator calculating the ratios between the paired characteristic magnitudes.

25. Detection device according to claim 24, wherein the actuation of the support of a tire on its safety bearing is detected when any of the ratios between the paired characteristic magnitudes is outside a give range.

26. Detection device according to claim 22, which comprises comparator means for comparing the characteristic magnitudes wherein said comparator means comprises:
   a) an adder adding up the characteristic magnitudes in pairs, and obtaining the values D1 and D2 thereof;
   b) a mechanism subtracting and adding said values D1 and D2, so that numerical quantities $A=D1-D2$ and $B=D1+D2$ are obtained;
   c) a calculator calculating the ratio between the absolute values of said quantities A and B; and d) an analyzer analyzing said ratios and detecting the actuation of support as soon as at least one of said ratios exceeds a given threshold.

27. Detection device according to claim 26, wherein said comparator comparing the characteristic magnitudes among themselves raises the values D1 and D2 to a power N.

28. Detection device according to claim 27, wherein the value of N governs the sensitivity of the device.

29. Device for the detection of the actuation of support of at least one of the tires on a vehicle on a safety bearing, which comprises:

a) an acceleration-measurement measurer positioned at the wheel-carriers of the wheels of said vehicle;

b) a filter filtering the measurement signals from said acceleration-measurement measurer in two given frequency bands wherein each of said frequency bands exceeds 100 Hz;

c) a processor providing the root mean square values D1 and D2 of said measurement signals, said root mean square values being monitored as characteristic magnitudes;

d) a calculator calculating a ratio D1/D2 of the characteristic magnitudes emanating from the various wheel-carriers independently for the measurements of each wheel-carrier;

e) an analyzer analyzing said ratios and detecting the actuation of support as soon as at least one of said ratios exceeds a given threshold; and f) a transmitter transmitting results detecting actuation of the support to the driver of the vehicle.

* * * * *

UNITED STATES PATENT AND TRADEMARK OFFICE
CERTIFICATE OF CORRECTION

PATENT NO.  : 6,094,978
DATED       : August 1, 2000
INVENTOR(S) : Claudio Battocchio et al.

It is certified that error appears in the above-identified patent and that said Letters Patent is hereby corrected as shown below:

Column 1,
Line 57, change "a nd" to -- and --; same line, change "th e" to -- the --;
Line 67, change "a nd" to -- and --.

Column 2,
Line 26, insert -- . -- after "system".

Column 3,
Line 64, insert hyphen at end of line.

Column 5,
Line 46, insert -- 454 -- after "453,";
Line 49, change "calculate" to -- calculates --;
Line 59, change "457" to -- 457 calculates --
Line 61, change "and to" to -- and is compared to --;
Line 65, change "axle-by-axle" to -- axle by axle --.

Column 6,
Line 3, insert -- is compare -- after "and";
Line 29, delete "D" before "and";
Line 66, change "S1S4" to -- S1+S4 --.

Column 7,
Line 8, change "transmit" to -- transmits --;
Line 18, change "in" to -- of --;
Line 28, change "of" to -- being --;
Line 52, delete "variant"
Line 55, change "F," to -- $F_1$ --
Line 60, change "values or" to -- or values --.

UNITED STATES PATENT AND TRADEMARK OFFICE
CERTIFICATE OF CORRECTION

PATENT NO.    : 6,094,978
DATED         : August 1, 2000
INVENTOR(S)   : Claudio Battocchio et al.

It is certified that error appears in the above-identified patent and that said Letters Patent is hereby corrected as shown below:

<u>Column 10,</u>
Line 57, change "give" to -- given --.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*